Figure 1:
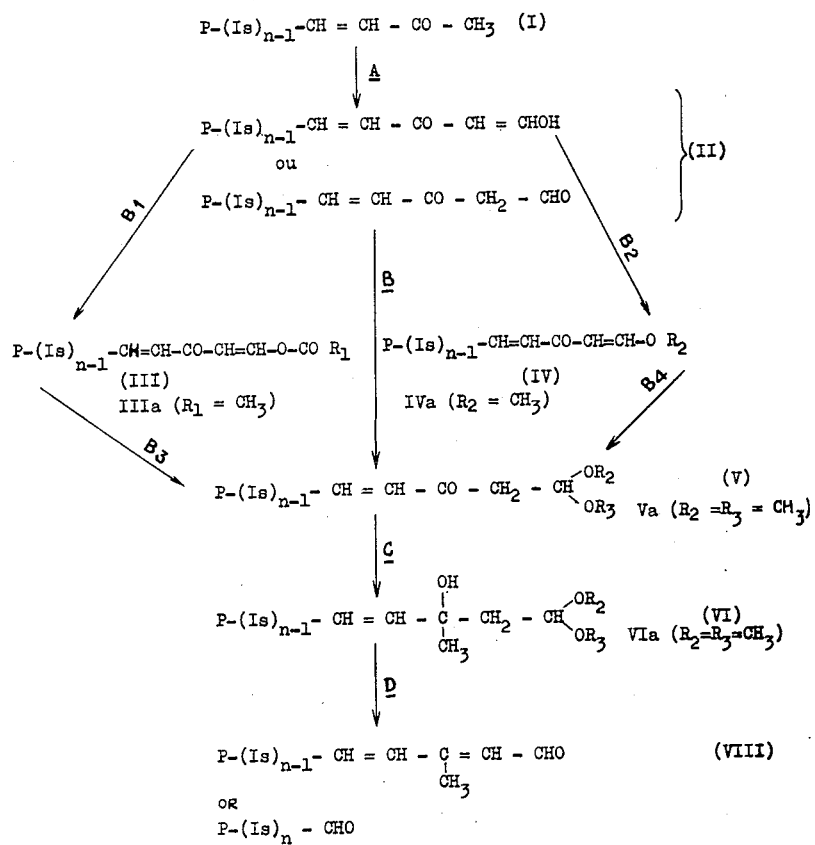

Aug. 18, 1964   G. J. M. NICOLAUX ETAL   3,145,233
PROCESS FOR THE PREPARATION OF VITAMIN A TYPE ALDEHYDES
Filed June 20, 1960   2 Sheets-Sheet 2
Fig. 2.
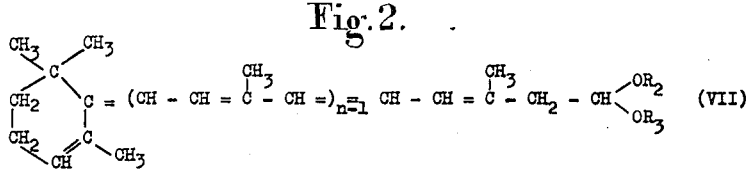
Fig. 3.
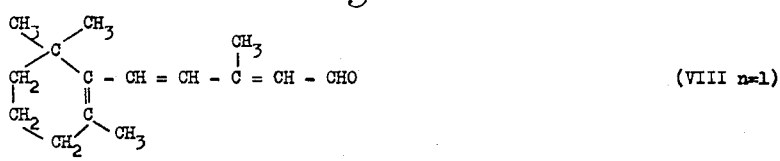
Fig. 4.
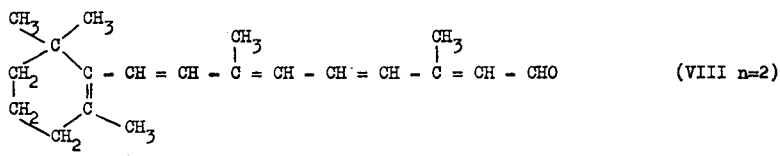
Fig. 5.
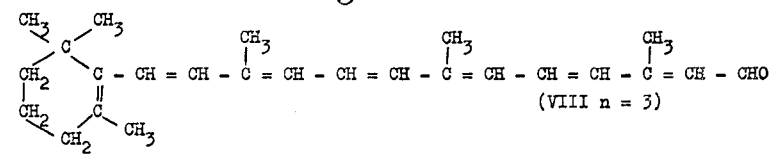
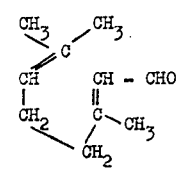
Fig. 6.
INVENTORS
GENEVIEVE JEANNE MATHILDE NICOLAUX
ERNEST ANDRE GAY
JEAN MATET
ROBERT LUCIEN HENRI MAUGE
CELESTIN MARIE JOSEPH SANDEVOIR
ALBERT JACQUES ANTOINE WASMER

United States Patent Office 3,145,233
Patented Aug. 18, 1964

3,145,233
PROCESS FOR THE PREPARATION OF
VITAMIN A TYPE ALDEHYDES
Genevieve Jeanne Mathilde Nicolaux, Ernest Andre Gay, and Jean Matet, Commentry, Robert Lucien Henri Mauge, Aubervilliers, and Celestin Marie Joseph Sandevoir and Albert Jacques Antoine Wasmer, Commentry, France, assignors to Societe Anonyme dite: A.E.C. Societe de Chimie Organique and Biologique, Commentry (Allier), France
Filed June 20, 1960, Ser. No. 37,456
Claims priority, application, France, July 6, 1959, 799,395, Patent 1,243,824
1 Claim. (Cl. 260—598)

It is an object of this invention to provide a novel process for the formation of isoprene linkages $$(=CH-C=CH-CH=)$$
$$\phantom{(=CH-}CH_3$$

and more particularly to provide a novel synthesis of substances of the carotenoid family characterized by such linkage.

The invention proposes more particularly to provide a novel synthesis of aldehydes such as beta-ionylideneacetaldehyde (FIGURE 3 of the accompanying drawings), the aldehyde of vitamin A, or Retinene (FIGURE 4) and the $C_{25}$ aldehyde (FIGURE 5).

These aldehydes are represented by the general formula:

$$P—(Is)_n—CHO \qquad (VIII)$$

wherein P is the radical 2:6:6-trimethyl-cyclohexene-1-yl characteristic of such substances, Is is an isoprene residue $$-CH=CH-C=CH-$$
$$\phantom{-CH=CH-}CH_3$$

and n is an integer equal to 1, 2 and 3. Clearly therefore, these aldehydes differ merely by an isoprene residue, i.e. they are isoprenologic. The invention provides a simple means of introducing the isoprene residue into the molecule of such compounds to arrive at any of the aldehydes previously mentioned.

Very few methods of achieving this isoprene linkage have so far been proposed. Only one method is really complete; it consists mainly of performing a Reformatsky reaction on a ketone such as beta-ionone, dehydrating the resultant hydroxy-ester, reducing the beta-ester to alcohol (by lithium or aluminium hydride) and oxidizing the alcohol to the corresponding aldehyde either by means of the Oppenauer reaction (U.S. specification No. 2,576,103 of August 10, 1947) or by manganese dioxide (Wendler et al. J.A.C.S. 1951, 73, p. 719–724). To the same end, steps have been proposed to obviate using the Reformatsky reaction, such as the method disclosed by Huisman et al., Rec. Trav. Chim. Pays-Bas, 1952, 71, 899–919, in which beta-ionone and cyanacetic acid are condensed, whereafter the nitrile is reduced directly to aldehyde, or the other method, described by Arens and Van Dorp, Rec. Trav. Chim. Pays-Bas 1948, 67, 973–979, using ethoxy-acetylene which, when applied to beta-ionone, yields beta-ionylidene-acetaldehyde and, when applied to the $C_{18}$ ketone, yields Retinene.

In all these known processes, however, the chain of the methyl-ketone R—CO—CH_3 serving as starting material is elongated by the reactive properties of the ketone function being used, the methyl group being converted into a side chain:

$$R-CO-CH_3 \longrightarrow R-\underset{\underset{CH_3}{|}}{C}-R' \qquad (1)$$

In the process according to the invention, on the other hand, the chain is lengthened by starting from the methyl group:

$$R-CO-CH_3 \rightarrow R-CO-CH_2-R' \qquad (2)$$

This invention therefore relates to a process for the preparation of isoprene compounds of the carotenoid family, and more particularly aldehydes having the general formula:

$$P—(Is)_n—CHO \qquad (VIII)$$

wherein P is the radical 2:6:6-trimethyl-cyclohexene-1-yl characteristic of these substances, Is is an isoprene residue $$-CH=CH-C=CH-$$
$$\phantom{-CH=CH-}CH_3$$

and n is an integer equal to 1, 2 and 3, characterized in that there is used as starting material the methyl-ketone having the general formula:

$$P—(Is)_{n-1}—CH=CH—CO—CH_3 \qquad (I)$$

wherein P, Is and n have the meanings just given, and in that the side chain is lengthened by its end methyl group.

A vague indication of such a method is given in French specification No. 886,753 of October 13, 1942, and in the publications of Shantz (J.A.C.S. 1946, 68, 2553–2557), but in neither case were the writers able, for reasons to be described hereafter, to lead this method of lengthening the chain to be required aim.

However, this aim can readily be achieved by means of the process according to the invention. One of the interesting features of the process according to the invention is that it makes it possible to pass from the ketone I to the aldehyde VIII, which has two carbon atoms more than the ketone I, by mainly using the sequence of the following other reactions (see FIGURE 1):

(A) Condensation of the ketone $$P—(Is)_{n-1}—CH=CH—CO—CH_3 \qquad (I)$$

wherein P, Is and n have the aforesaid meanings, with an alkyl formate to give the beta-keto-enol:

$$P—(Is)_{n-1}—CH=CH—CO—CH=CHOH \qquad (II)$$

(B) Blocking of the enol-beta-ketone function in the form of beta-keto-acetal (V) of the tautomeric aldehyde.

(C) Reducing methylation of the ketone function of the beta-keto-acetal leading to a beta-methyl-beta-hydroxy-acetal (VI).

(D) Conversion of the compound thus yielded into the required aldehyde:

$$P—(Is)_n—CHO \qquad (VIII)$$

This sequence A–B–C–D is illustrated in FIGURE 1 of the accompanying drawings wherein the various reactions have the same letters A or B or C or D used in the description of the process, while the compounds occurring in the process are indicated by Roman numerals.

Reaction B is the key phase of this chain of reactions. The two works previously mentioned (French specification No. 886,753 of October 13, 1942, and the publications of Shantz, J.A.C.S., 1946, 68, 2553–2557) did not provide a satisfactory passage from compound II to compound VIII, for when reacting of the Grignard reagent (reaction C) on the sodium salt, in the beta-ketoenol form, of compound II ($n=1$), a 1–4 addition is the main thing produced and the resultant product gives substantially no beta-ionylidene-acetaldehyde (VIII $n=1$) during the subsequent reaction D.

Shantz mentions the direct preparation of ethyl betaketo-acetal from compound II ($n=1$) by the action of ethyl alcohol in the presence of calcium chloride. He notes a very poor yield at distillation, and the physical properties of the product are not described except for the maximum ultra-violet absorption at 300μ, although the complete spectrum is not given.

Work done by the applicant company has shown that when Shantz's work is reproduced, there are yielded more particularly type IV derivatives, i.e. enol-ethers. These lead, by a Grignard reaction (reaction C) to a very large 1–4 addition and the resultant product, when treated with reaction D, does not lead to beta-ionylidene-acetaldehyde VIII ($n=1$).

Contrary to what Shantz states, it has been found that the ketone function of correctly prepared beta-keto-acetals reacts normally in some conditions with metallorganic substances such as methyl-lithium or methyl-magnesium mixtures, to give a beta-methyl-beta-hydroxy-acetal VI.

Consequently, to produce the chain of reactions claimed by this invention the beta-keto-acetals V, which are the only ones that undergo reaction C normally, must be prepared. In practice the passage from compound II to compound V can be either direct (reaction B) or by way of compound III (reactions $B_1$ and $B_3$) or by way of compound IV (reactions $B_2$ and $B_4$).

The compound II yielded by reaction A exists in two tautomeric forms—the beta-keto-enol form and the beta-keto-aldehyde form. Derivatives of both forms can be prepared.

The enol hydroxyl readily gives derivatives such as the esters III with organic acids (reaction $B_1$):

$$P—(Is)_{n-1}—CH=CH—CO—CH=CH—O—CO—R_1 \quad (III)$$

or the ethers IV (reaction $B_2$):

$$P—(Is)_{n-1}—CH=CH—CO—CH=CH—O—R_2 \quad (IV)$$

In the beta-keto-aldehyde tautomeric form compound II gives beta-keto-acetals (reaction B):

$$P—(Is)_{n-1}—CH=CH—CO—CH_2—CH\begin{matrix}OR_2\\OR_3\end{matrix} \quad (V)$$

Also, it is easy to pass from compounds III to compounds V (reaction $B_3$) and from compounds IV to compounds V (reaction $B_4$).

An object of this invention is to prepare the beta-keto-acetals either directly from compound II or by passing intermediately through compounds III or compounds IV.

The compounds II ($n=2$ and 3), their sodium salts, the esters III ($n=1, 2$ and 3), the ethers IV ($n=1$ and 2) the acetals V ($n=1$ and 3) and the hydroxy-acetals VI ($n=1$ and 3) are novel products, the usefulness of which has just been described herein. Similar considerations apply to the compounds VII ($n=1$ and 2) (FIGURE 2) which, as will be seen hereafter, intervene in reaction D which leads to the unsaturated alpha-beta-aldehyde:

$$P—(Is)_n—CHO \quad (VIII)$$

The invention therefore also relates, as novel intermediate products, to these different compounds.

The general compounds II–VII, most of which are novel, will be studied in greater detail in connection with the description given in the detailed examples hereinafter of the consecutive application of the novel sequence of reactions claimed to beta-ionone, the $C_{18}$ ketone and the $C_{23}$ ketone.

Using the sequence of reactions according to the invention, it is possible to pass:

From a $C_{13}$ ketone (beta-ionone I $n=1$) to the $C_{15}$ aldehyde, beta-ionylidene acetaldehyde (VIII $n=1$);

From a $C_{18}$ ketone (ketone $C_{18}$ I $n=2$) to the $C_{20}$ aldehyde (Retinene VIII $n=2$);

From a $C_{23}$ ketone (ketone $C_{23}$ I $n=3$) to the $C_{25}$ aldehyde (aldehyde $C_{25}$ VIII $n=3$).

The $C_{18}$ ketone (I $n=2$) required for the second series of reactions can be readily prepared by condensing acetone on beta-ionylidene-acetaldehyde (VIII $n=1$) for instance, in the presence of a catalyst such as an alkali metal alcoholate or an alkali metal hydroxide, as described in French specification No. 1,167,007 applied for on February 4, 1954.

Similarly, the $C_{23}$ ketone required for the third series of reactions is prepared from Retinene (VIII $n=2$) by condensation with acetone as described in the specification just mentioned.

Also the beta-ionone (I $n=1$) is prepared by the same reaction from citral, a natural product represented by FIGURE 6, followed by cyclisation of the product prepared.

Clearly, therefore, by means of a fifth reaction (condensation with acetone—French specification 1,167,007 of February 4, 1954—which may or may not be followed by cyclisation), the sequence of reactions according to the invention provides seriatim from citral: the beta-ionone I $n=1$, the beta-ionylidene-acetaldehyde VIII $n=1$, the $C_{23}$ ketone I $n=3$, the $C_{25}$ aldehyde VIII $n=3$, by a series of reactions which are repeated and which are linked together satisfactorily.

More particularly, the process according to the invention yields Retinene (VIII $n=2$), a substance which can be readily converted into vitamin A by reduction by known processes. Consideration will now be given to the general working conditions which are required for reactions A, B, C and D and which are the same whether $n$ is 1 or 2 or 3.

REACTION A

This reaction of condensing a formate HCOOR, R being a hydrocarbon radical such as an alkyl radical, with the compound I is of the family of Claisen reactions and can convenviently be performed as described in the description of such reactions. The application of this general reaction to the special kind of ketones used in this invention is not associated with any difficulties, but special care is required to protect the substances from the action of air. In a preferred method of working there are used ethyl or methyl formate, catalysts such as some metal alcoholates (sodium ethylate or methylate) or sodium hydride or even sodium metal, anhydrous solvents such as ethyl or isopropyl ether or even hydrocarbons such as benzene or 65–70° C. petroleum ether, the reaction temperature being equal to or less than the ambient temperature, the reaction time being about 1 hour. Compound II precipitates as the enolate of the metal intervening in the composition of the catalyst. Consequently a crystallised sodium enolate can be prepared which is hygroscopic and very sensitive to air and which gives a solution or a pseudo-solution in an aqueous medium. To isolate the beta-keto-enol acidification is performed with an iced dilute acid such as hydrochloric acid, and the enol is extracted with an organic solvent such as ethyl ether.

REACTION B

The purpose of this reaction is to lock the compound in one of its two tautomeric forms, to allow of subsequent convenient working on the ketone function. In practice, for reaction C to be performed correctly the locking must be achieved by acetalisation of the beta-keto-aldehyde form. These acetals can be prepared in three different ways, as follows:

(a) *Reaction B proper.*—I.e. direct passage from beta-keto-enol, either free or in the sodium salt form, to beta-keto-acetal. Preferably, this passage is achieved by reaction with a low-molecular-weight alcohol at ambient temperature in the presence of traces of an acid catalyst and of a readily hydrolysable ester of the same alcohol, such as the formate or the acetate.

(b) *Passage in two steps denoted by $B_1$ and $B_3$.*—Reaction $B_1$ provides a passage from the beta-keto-enol form of compound II, either free or, and preferably, in the sodium salt form, to the acylated derivative III. This reaction is performed by the action of an acid anhydride or chloride on the sodium salt of beta-keto-enol in an anhydrous medium. There are preferably used for this purpose the chloride or anhydride of a low molecular weight aliphatic acid, for instance, acetyl chloride or acetic anhydride.

Reaction $B_3$ provides a passage from compound III to compound V and is achieved by the action of a low-molecular-weight alcohol on compound III in the presence of traces of an acid catalyst. Reaction $B_3$ only leads to the compounds V where $R_2=R_3$.

(c) *Passage in two steps denoted by $B_2$ and $B_4$.*—Reaction $B_2$ provides a passage from the beta-keto-enol form of compound II, either free or, and preferably, in the sodium salt form, to compound IV and is performed by the action of an alkyl halide or sulphate on the beta-keto-enol which is either free or, and preferably, in the sodium salt form, in an appropriate solvent, i.e. a solvent for the reagents which does not react with them, such as dimethyl formamide or isopropanol. Preferably, a low molecular weight alkyl halide or sulphate is used, such as methyl sulphate.

Reaction $B_4$ provides a passage from compound IV to compound V which is achieved by the action of a low-molecular-weight alcohol on compound IV in the presence of traces of an acid catalyst. When the alcohol used has the same alkyl residue as the alkyl halide or sulphate used in reaction $B_2$, the acetal V has identical radicals $R_2$ and $R_3$. If the alcohol has an alkyl residue which is different from the alkyl halide or sulphate used in reaction $B_2$, the acetals V have different radicals $R_2$ and $R_3$.

The acetals V and the intermediate compounds III and IV are clearly distinguished and differentiated from one another by a number of different physical and chemical properties such as Refractive index,
Boiling point,
Ultra-violet absorption spectrum,
Infra-red absorption spectrum to characterize the functional groups,
Determination of the alkoxy group.

REACTION C

This reaction is a conventional Grignard reaction in which a compound $CH_3Z$, wherein Z is lithium or a halogeno-magnesium residue MgX or a halogeno-zinc residue ZnX, is reacted with the ketone function of the beta-keto-acetal V. As already known by Price and Pappalardo (J. Am. Chem. Soc., 1950, 72, 2613-15), this ketone function reacts normally under certain conditions; the radical Z is fixed to the oxygen, while the methyl group becomes fixed to the carbon.

To perform the reaction correctly the beta-keto-acetal V must be introduced in an excess of $CH_3Z$ reagent into an appropriate solvent, such as ethyl or isopropyl ether, at a temperature near ambient temperature, the reverse method of working giving less satisfactory results. Agitation can conveniently be provided but is not essential since the reaction medium is homogeneous. The beta-hydroxy-beta-methyl-acetal VI is liberated from its metal complex form by the action of an iced dilute acid or by ammonium chloride and extracted by the reaction solvent, for instance ether. Of the methyl-magnesium halides, the chloride is better than the bromide and iodide.

REACTION D

Reaction D covers all the conversions leading from compound VI to compound VIII. This sequence of conversions, which includes the dehydration of a tertiary alcohol and the hydrolysis of an acetal group, can be performed in one or more steps.

This sequence of conversions starting from compound VI ($n=1$) will now be studied in greater detail.

It is conventional to dehydrate a tertiary alcohol by means of a mineral acid. Also an acetal can be hydrolysed with aqueous hydrochloric acid (Grignard, Precis de Chimie Organique, 3rd Edition, Paris 1949, p. 455) in a water-miscible organic solvent in which the products to be treated and the acid are soluble (Houbenweil, "Methoden der Organischen Chemie" 4th ed. tome 7/1 (1954) p. 423, 425). To simplify the linking of the reactions it seemed advisable to use acetone as solvent. Indeed, in the same hydro-acetonic medium, alkalinisation by means of a dilute aqueous mineral base leads to the condensation of the aldehyde VIII obtained on the acetone, thus leading directly, without isolation of intermediates, to the ketone I $n=2$ according to the aforesaid French specification 1,167,007.

The passage from compound VI to compound VIII is therefore achieved in acetone by using aqueous hydrochloric acid. Study of the reaction included a study of its evolution in time by ultra-violet spectra and by alkoxy group determinations. It was found that this conversion, which is essentially a dehydration of the tertiary alcohol and a hydrolysis of the acetal group, passed spontaneously, in the conditions used (aqueous hydrochloric acid in acetone), through the following phases:

(a) First, simple dehydration leading to the retro-acetal VII ($n=1$) (FIGURE 2), followed by:

(b) Hydrolysis of the acetal group, spontaneously and completely giving compound VIII ($n=1$).

With a view to improving this sequence of conversions we have been able to isolate and purify the first intermediate product VII. The same can be prepared more satisfactorily by careful selection of the conditions in which dehydrating alone is performed. Dehydration is best performed in the same alcohol as the acetal group by the action of a trace of acid.

The passage from compound VII to compound VIII is associated with the same working conditions as the direct passage from compound VI to compound VIII, i.e. the action of aqueous hydrochloric acid in acetone.

Everything that has been stated about the passage of compound VI to compound VIII when $n=1$ applies when $n=2$ and $n=3$.

The compounds VII ($n=1$, 2 and 3) are, as already stated, novel products which are claimed as such and the advantage of which is shown by this invention.

The following examples illustrate but do not limit the invention. The first examples relate to the series of reactions on the beta-ionone, compound I ($n=1$), and leading to the beta-ionylidene acetaldehyde VIII ($n=1$), while the second group of examples relates to the passage from $C_{18}$ ketone I ($n=2$) to Retinene VIII ($n=2$), and the third group of examples relates to the passage from $C_{23}$ ketone I ($n=3$) to the aldehyde VIII ($n=3$).

Finally, mention is made of the passage from the aldehydes VIII ($n=1$ and $n=2$) to the ketones I ($n=2$ and $n=3$). By these reactions the different series forming the subject matter of this patent can be linked together through the agency of a process which resembles that disclosed in French specification No. 1,167,007 applied for on February 4, 1954.

*Example 1*

Sodium salt of beta-keto-enol (II $n=1$) prepared from beta-ionone, or sodium salt of 5-(2':6':6'-trimethylcyclohexene-1'-yl)-1-hydroxy-3-keto-penta-1:4-diene, or beta-keto-enol $C_{14}$ for short.

10 g. of sodium filaments, a mixture of 33 g. of ethyl formate and 66 g. of beta-ionone in 135 cc. of anhydrous ether are introduced into 500 cc. of anhydrous ether with a stream of dry nitrogen. The temperature is maintained at 30° C. with agitation. After 2 hours agitation the mixture is filtered, washed in 800 cc. of anhydrous ether and dried in vacuo on phosphorous pentoxide.

47 g. of a white, very hygroscopic, water-soluble powder are yielded which gives an orange-colored solution with a very strong alkaline reaction. The ultra-violet spectrum in isopropanol $E_{1\,cm}^{1\%}$ maximum $335\mu = 668$

Example 2

Free beta-keto-enol (II $n=1$) or: 5-(2':6':6'-trimethyl-cyclohexene-1-yl)-1-hydroxy-3-keto-penta-1:4-diene.

5 g. of the beta-keto-enol sodium salt prepared as in Example 1 are treated with 100 cc. of iced N hydrochloric acid. The mixture is agitated strongly, extracted with ether, washed until neutral, and dried on sodium sulphate. After evaporation of the ether 4.5 g. of a viscous orangy oil are yielded:

$n_D^{18} = 1.610$ $E_{1\,cm}^{1\%}$ maximum $335\mu = 700$ (isopropanol)

Example 3

Methyl beta-keto-enol-ether IV$a$ ($n=1$, $R_2=CH_3$) or: 5 - (2':6':6' - trimethyl - cyclohexene - 1' - yl) - 1 - methoxy-3-keto-penta-1:4-diene.

20 g. of the beta-keto-enol sodium salt prepared as in Example 1 are dissolved in 100 cc. of dimethylformamide and immediately reacted at ambient temperature with 10 g. of methyl sulphate. After the mixture has been allowed to stand for 3 hours, it is poured into water, extracted with ether, washed and dried. After evaporation of the ether 17.8 g. of methyl enol-ether are yielded. The product is viscous and of an orangy-red color and is insoluble in sodium and potassium.

$n_D^{18} = 1.556$ $E_{1\,cm}^{1\%}$ maximum $305\mu = 595$ (isopropanol)

Determination of methoxy group: 11.4%

*Purification.*—A viscous orangy oil is yielded as a result of distillation at 0.8 mm. The boiling point at 0.8 mm. is 142–145° C.

$n_D^{18} = 1.552$ $E_{1\,cm}^{1\%}$ maximum $305\mu = 618$ (isopropanol)

Determination of methoxy group: 11.6%

Alternatively purification can be effected by chromatography on a Doucil column of the enol-ether solution in petroleum ether. The product is washed out with petroleum ether to 10% ethyl ether; the washings give a Carr-Price reaction with antimony trichloride, strong yellow. The determination of the methoxy group of this fraction gives 12%.

Example 4

Acetylated derivative of the beta-keto-enol III$a$ ($n=1$, $R_1=CH_3$), or 5-(2':6':6'-trimethyl-cyclohexene-1'-yl)-1-acetoxy-3-keto-penta-1:4-diene, or acetoxy $C_{14}$ for short.

There are introduced into a 3 litre flask which has been dried, and from which the air has been removed by a stream of dry nitrogen, 400 cc. of anhydrous ether and then, with agitation and while the nitrogen stream is maintained, 54 g. of dry sodium methylate. The mixture is cooled to 0° C. and within one-quarter of an hour there are introduced 82 cc. of ethyl formate in 82 cc. of anhydrous ether, the temperature being maintained at 0° C. Half an hour later 100 g. of B-ionone in 400 cc. of anhydrous ether are added. It will be found that the beta-keto-enol sodium salt gradually precipitates so that agitation becomes difficult. 250 cc. of absolute ethyl alcohol are then added, then 104 cc. of acetic anhydride in 400 cc. of ether with agitation, the temperature being maintained below +5° C. Agitation is continued for another 3 hours, the temperature being allowed to rise. The mixture is poured into water, extracted with ether, carefully washed to remove any excess anhydride, and dried. The ether is removed and a yield of 123 g. of raw acetylated derivative is achieved:

$n_D^{18} = 1.540$ $E_{1\,cm}^{1\%}$ maximum $320\mu = 385$ (isopropanol)

Other absorption maximum at $250\mu$:

$E_{1\,cm}^{1\%}$ maximum $250\mu = 416$

*Purification.*—The product can be recrystallized in 5 volumes of petroleum ether (65–70°) or in two volumes of ethyl formate. After the mixture has been allowed to rest in the freezer, 63 g. of needle crystals can be obtained by centrifuging:

$E_{1\,cm}^{1\%}$ maximum $320\mu = 425$ (isopropanol)

$E_{1\,cm}^{1\%}$ maximum $250\mu = 476$ (isopropanol)

Example 5

Beta-keto-acetals V ($n=1$) or 5-(2':6':6'-trimethyl-cyclohexene-1'-yl)-1:1-dialkoxy-3-keto-penta-4-ene, or acetal $C_{14}$ for short.

(*a*) Dimethyl beta-keto-acetal V$a$ $$(n=1, R_2=R_3=CH_3)$$

or 5-(2':6':6'-trimethyl-cyclohexene-1' - yl) - 1:1-dimethoxy-3-keto-penta-4-ene, from the beta-keto-enol sodium salt prepared as in Example 1.

30 g. of the beta-keto-enol sodium salt are dissolved in 73 cc. of methanol. The solution is poured, the temperature being maintained the same as the ambient temperature, into a mixture of 75 cc. of methanol containing 5 g. of gaseous hydrochloric acid and 30 cc. of methyl formate. After the mixture has stood for 1½ hours at the ambient temperature, it is poured into water, extracted with ether, washed and dried. After evaporation of the ether 32 g. of a fluid orange oil are yielded:

$n_D^{18} = 1.512$ $E_{1\,cm}^{1\%}$ maximum $300\mu = 395$ (isopropanol)

Determination of methoxy group: 20.3%.

(*b*) Dimethyl beta-keto-acetal V$a$ $$(n=1, R_2=R_3=CH_3)$$

or 5 - (2':6':6' - trimethyl-cyclohexene-1'-yl)-1:1-dimethoxy-3-keto-penta-4-ene, from the unisolated beta-keto-enol sodium salt.

100 g. of beta-ionone are given the treatment described in Example 4. After or during the precipitation of the beta-keto-enol sodium salt, 25 cc. of absolute alcohol are added, then 80 g. of acetyl chloride in 400 cc. of anhydrous ether are added, the temperature being maintained at 0° C. 500 cc. of absolute methyl alcohol are then added and the temperature is allowed to rise while agitation is continued for three hours. The mixture is poured on to 5% sodium bicarbonate, washed in water and dried. The ether is removed to yield 130 g. of dimethyl beta-keto-acetal.

$n_D^{18} = 1.514$ $E_{1\,cm}^{1\%}$ maximum $300\mu = 375$ (isopropanol)

Determination of methoxy group: 20%.

(*c*) Diethyl beta-keto-acetal V$b$ $$(n=2, R_2=R_3=CH_2CH_3)$$

or 5-(2':6':6'-trimethyl-cyclohexene-1'-yl)-1:1-diethoxy-3-keto-penta-4-ene, from the unisolated beta-keto-enol sodium salt.

This derivative is prepared as described in Example 5$b$ except that the methyl alcohol is replaced by ethyl alcohol. Isolation is performed in the same way to obtain a yield of 140 g. of diethyl beta-keto-acetal.

$n_D^{18} = 1.512$ $E_{1\,cm}^{1\%}$ maximum $300\mu = 335$ (isopropanol)

Determination of ethoxy group: 23%.

(*d*) Dimethyl beta-keto-acetal V$a$ $$(n=1, R_2=R_3=CH_3)$$

or 5-(2':6':6'-trimethyl-cyclohexene-1'-yl) - 1:1 - dimethoxy-3-keto-penta-4-ene, from the methyl beta-keto-enol ether IV$a$.

4 g. of methyl beta-keto-enol ether prepared as described in Example 3 are dissolved in 20 cc. of absolute methanol. 0.10 cc. of concentrated sulphuric acid are added. The mixture, after standing for 2 hours at the ambient temperature, is poured into water, extracted with ether, washed until neutral and dried. After evaporation of the ether a fluid oil is left.

$n_D^{18} = 1.513$ $E_{1\,cm}^{1\%}$ maximum $300\mu = 388$ (isopropanol)

Determination of methoxy group: 20%.

(e) Dimethyl beta-keto-acetal Va $(n=1, R_2=R_3=CH_3)$ or 5-(2':6':6'-trimethyl cyclohexene-1'-yl) - 1:1 - dimethoxy-3-keto-penta-4-ene, from the acetylated derivative of the beta-keto-enol IIIa.

50 g. of the acetylated beta-keto-enol derivative prepared as in Example 4 are dissolved in 250 cc. of methanol and 1.25 cc. of concentrated sulphuric acid are added to the mixture. The mixture after standing for 4 hours at ambient temperature, is poured into water, extracted with ether, washed and dried. After evaporation of the ether 50.5 g. of dimethyl beta-keto-acetal are left.

$n_D{}^{18}=1.513$ $E_{1cm.}^{1\%}$ maximum $300\mu=385$ (isopropanol)

Determination of methoxy group: 22%.

*Purification of the dimethyl beta-keto-acetal Va* $(n=1, R_2=R_3=CH_3)$.—When distilled at 0.5 mm. the product appears in the form of a fluid orangy-yellow oil. The boiling point at 0.5 mm. is 132–134° C.

$n_D{}^{18}=1.510$ $E_{1cm.}^{1\%}$ maximum $300\mu=305$ (isopropanol)

Determination of methoxy group: 21.6%.

Purification can also be performed by chromatography on Merck alumina deactivated with 5% of water.

The dimethyl beta-keto-acetal thus purified has the following features:

$n_D{}^{18}=1.510$ $E_{1cm.}^{1\%}$ maximum $300\mu=390$ (isopropanol)

Determination of methoxy group: 21.5%.

Example 6

Dimethyl beta - methyl - beta - hydroxy - acetal VIa $(n=1, R_2=R_3=CH_3)$, or 5-(2':6':6'-trimethyl-cyclohexene - 1' - yl) - 3 - methyl - 3 - hydroxy - 1:1 - dimethoxy-penta-4-ene, or hydroxy-acetal $C_{15}$ for short.

10 g. of dimethyl beta-keto-acetal prepared as described in Examples 5a, 5b, 5c and 5d are dissolved in 20 cc. of anhydrous ether and slowly added to a solution of methyl-magnesium chloride (prepared from 1.7 g. of magnesium) in 30 cc. of anhydrous ether. The resultant mixture is then poured on to an iced N/5 hydrochloric acid solution, washed and dried, and the ether is evaporated, 10.5 g. of a light yellow oil being left.

$n_D{}^{18}=1.490$ $E_{1cm.}^{1\%}$ maximum $230\mu=198$ (isopropanol)

Determination of methoxy group: 17.2%.

*Purification.*—This derivative can be purified by chromatography on Gammagel. A purified product is isolated which has the following features:

$n_D{}^{18}=1.489$ $E_{1cm.}^{1\%}$ maximum $230\mu=185$ (isopropanol)

Determination of methoxy group: 19.2%.

Example 7

Dimethyl retro-acetal VIIa $(n=1, R_2=R_3=CH_3)$, or 5 - (2':6':6' - trimethyl - cyclo - hex - 2' - ene - 1' - ylidene)-3-methyl-1:1-dimethoxy-penta-3-ene, from the dimethyl beta-methyl-beta-hydroxy-acetal VIa.

100 g. of dimethyl beta-methyl-beta-hydroxy-acetal prepared as described in Example 6 are dissolved in 750 cc. of methanol and 5 cc. of concentrated sulphuric acid are added. The mixture, after standing for 1 hour at ambient temperature, is poured into water, extracted with ether, washed and dried. After evaporation of the ether 96 g. of fluid oil are obtained.

$n_D{}^{18}=1.530$ $E_{1cm.}^{1\%}$ maximum $285\mu=955$ (isopropanol)

Determination of methoxy group: 20%.

*Purification.*—This product can be purified by chromatography on Gammagel. The purified dimethyl retro-acetal has the following features:

$n_D{}^{18}=1.532$ $E_{1cm.}^{1\%}$ maximum $285\mu=1060$ (isopropanol)

Determination of methoxy group: 21.2%.

The product can also be purified by molecular distillation. The product distils without decomposition at a temperature of 145° C. in a vacuum of 0.1 mm. Hg.

Example 8

Beta-ionylidene acetaldehyde VIII $(n=1)$, or 5-(2':6':6' - trimethyl - cyclohexene - 1' - yl) - 3 - methylpenta-2:4-diene-1-al, or aldehyde $C_{15}$ for short.

(a) From the dimethyl retro-acetal VIIa: 10 g. of the dimethyl retro-acetal prepared as described in Example 7 are heated to boiling point in 100 cc. of acetone with 2 cc. of N hydrochloric acid. The mixture, after boiling for one hour, is poured into water, extracted with petroleum ether, washed and dried. Evaporation of the petroleum ether leaves a thick orangy-brown oil:

$n_D{}^{18}=1.572$ $E_{1cm.}^{1\%}$ maximum $320\mu=475$ (isopropanol)

Determination of methoxy group: 1.9%.

(b) From the dimethyl beta-methyl-beta-hydroxyacetal VIa $(n=1, R_2=R_3=CH_3)$:

50 g. of dimethyl beta-methyl-beta-hydroxy-acetal prepared as described in Example 6 are dissolved in 500 cc. of acetone. The mixture is heated to boiling point and 10 cc. of N hydrochloric acid are added. The mixture, after having boiled for 1 hour, is extracted with petroleum ether after being poured into water, is washed and dried. After evaporation of the petroleum ether a thick orangy-brown oil is left:

$n_D{}^{18}=1.576$ $E_{1cm.}^{1\%}$ maximum $320\mu=545$ (isopropanol)

Determination of methoxy group: 1%.

*Purification.*—The beta-ionylidene acetaldehyde can be purified by conventional chromatography on alumina of a solution in petroleum ether. A purified beta-ionylidene acetaldehyde fraction can therefore be prepared with the following features:

$n_D{}^{18}=1.578$ $E_{1cm.}^{1\%}$ maximum $325\mu=650$ (isopropanol)

A second and slight peak at $270\mu$:

$$E_{1cm.}^{1\%}=520$$

The beta-ionylidene acetaldehyde can also be purified through the agency of its cyanacethydrazone. The same appears in the form of yellow flakes.

Melting point: 187° C. $E_{1cm.}^{1\%}$ maximum $320\mu=1,330$ (isopropanol)

Hydrolysis of this cyanacethydrazone by formol gives the purified beta-ionylidene acetaldehyde:

$n_D{}^{18}=1.580$ $E_{1cm.}^{1\%}$ maximum $325\mu=732$ (isopropanol)

Example 9

Acetylated derivative of the beta-keto-enol $C_{19}$ IIIa $(n=2, R_1=CH_3)$ or 9-(2':6':6'-trimethyl-cyclohexene-1'-yl)-7-methyl-1-acetoxy-3-keto-mona-1:4:6:8-tetra - ene, or Acetoxy $C_{19}$ for short.

160 cc. of anhydrous ether, followed by 23 g. of dry sodium methylate, are introduced into a 1 litre flask comprising an agitator and a dropping funnel, a stream of nitrogen being provided and protection from dampness being provided. The temperature is reduced to about +5° C. and maintained while 33 cc. of ethyl formate in 40 cc. of ether are introduced during a quarter of an hour. 50 g. of the $C_{18}$ ketone prepared by Example 18 hereof and purified, for instance, by molecular distillation $E_{1cm.}^{1\%}$ maximum $345\mu=1000$ and dissolved in 100 cc. of anhydrous ether are then added. The reaction requires half an hour, the temperature being maintained near +5° C. 43 cc. of 95% acetic anhydride dissolved in 160 cc. of anhydrous ether are then introduced, the temperature preferably being maintained at about 0° C. The reaction is completed within one quarter of an hour. The temperature is allowed to rise for one hour while agitation is continued. The mixture is poured on to 300 cc. of water, washed in water three times, dried on sodium sulphate and the ether is evaporated. 60 g. of the acetylated derivative of the $C_{19}$ beta-keto-enol are thus prepared.

$E_{1\,cm.}^{1\%}$ maximum $370/375\mu$ = about 800 (isopropanol)

Example 10

Corresponding dimethyl beta-keto-acetal Va ($n=2$, $R_2=R_3=CH_3$) or 9-(2':6':6'-trimethyl-cyclohexene-1'-yl)-7-methyl-1:1-dimethoxy-3-keto-nona - 4:6:2-triene, or Acetal $C_{19}$ for short.

36 g. of the acetylated derivative of the beta-keto-enol $C_{19}$ prepared as described in Example 9 are dissolved in 90 cc. of methanol. 0.9 cc. of concentrated sulphuric acid dissolved in 90 cc. of methanol is added, the temperature being maintained at the ambient temperature. The mixture, after standing for 2 hours, is poured on to 210 cc. of a 3% sodium bicarbonate solution and extracted with petroleum ether (boiling point: 65–70° C.) The mixture is washed until neutral with bicarbonate, then washed in water and dried on sodium sulphate. After evaporation with petroleum ether 36 g. of dimethyl beta-keto-acetal $C_{19}$ are left.

$E_{1\,cm.}^{1\%}$ maximum $350\mu = 780$ (isopropanol)

Determination of methoxy-group: 15.8%.

Acetal $C_{19}$ can be purified, for instance, by molecular distillation.

Example 11

Corresponding dimethyl beta-methyl-beta-hydroxy-acetal VIa ($n=2$, $R_2=R_3=CH_3$) or 9-(2':6':6'-trimethyl-cyclohexene - 1' - yl)-3:7-dimethyl-3-hydroxy-1:1-dimethoxy-nona-4:6:8-triene, or hydroxy-acetal $C_{20}$ for short.

50 g. of the dimethyl beta-keto-acetal $C_{19}$ prepared as described in Example 10 and purified, for instance, by molecular distillation $E_{1\,cm.}^{1\%}$ maximum $350\mu = 850$ determination of methoxy group: 17.2% are dissolved in 300 cc. of ether and added at ambient temperature to a solution of methyl-magnesium chloride (prepared from 8 g. of magnesium) in 400 cc. of ether. The addition should last for about half an hour; agitation is continued for another half hour and the mixture is then poured slowly on to a mixture of:

Ice _____g__ 400
2 N HCl_____cc__ 425
Ether _____cc__ 100

The mixture is washed with water and then with 5% bicarbonate and then again with water until it is neutral. The mixture is dried and the ether evaporated to give 50 g. of dimethyl beta-methyl-beta-hydroxy-acetal.

$E_{1\,cm.}^{1\%}$ maximum $290\mu = 800$ (isopropanol)

Determination of methoxy group: 15.9%.

Example 12

Corresponding dimethyl retro-acetal VIIa ($n=2$, $R_2=R_3=CH_3$), or 9-(2':6':6'-trimethyl-cyclohexene-2'-ylidene-1')-3:7-dimethyl - 1:1 - dimethoxy-nona-3:5:7-triene, or dimethyl retro acetal $C_{20}$ for short.

100 g. of the dimethyl beta-methyl-beta-hydroxy-acetal prepared as described in Example 11 are dissolved in 1 litre of methanol containing 5 cc. of concentrated sulphuric acid. After one quarter of an hour of contact at ambient temperature the mixture is poured on to 5% bicarbonate and extracted with petroleum ether having a boiling point of 65–70° C. The mixture is washed until neutral, and dried on sodium sulphate. A product having the following features is yielded:

$E_{1\,cm.}^{1\%}$ maximum principal $350\mu = 1,500$ − (isopropanol)

Determination of methoxy group: 14.5%.

*Purification.*—The dimethyl retro-acetal $C_{20}$ can be purified by molecular distillation, distilling without decomposition at 0.01 mm. Hg at a temperature of 150–155° C. An orange oil having the following features is produced:

$E_{1\,cm.}^{1\%}$ main maximum $350\mu = 1,670$ (isopropanol)

Determination of methoxy group: 15.7%.

Example 13

Retinene VIII ($n=2$), or 9-(2':6':6'-trimethyl-cyclohexene - 1' - yl)-3:7-dimethyl-nona-2:4:6:8-tetra-ene-1-al, or Aldehyde $C_{20}$ for short.

(a) *From the dimethyl retro-acetal VIIa ($n=2$).*—30 g. of dimethyl retro-acetal prepared as described in Example 12 and purified, for instance, by molecular distillation $E_{1\,cm.}^{1\%}$ $350\mu = 1,670$ determination of methoxy group: 15.7% are heated to boiling point in 300 cc. of pure acetone with 1% of an antioxidant. 6 cc. of N hydrochloric acid are added and the mixture is maintained at boiling point for 1 hour. The mixture is poured on to 450 cc. of 3% bicarbonate and extracted with 65–70° C. petroleum ether. The mixture is washed until neutral, and dried on sodium sulphate. A Retinene is prepared with the following features:

$E_{1\,cm.}^{1\%}$ maximum $370\mu = 1,000$ approximately.

Determination of methoxy group: 1.0%.

(b) *From the dimethyl beta-methyl-beta-hydroxy-acetal VIa ($n=2$, $R_2=R_3=CH_3$).*—50 g. of the dimethyl beta-methyl-beta-hydroxy-acetal prepared as described in Example 11 are heated to boiling point in 500 cc. of pure acetone with 1% of an antioxidant. 10 cc. of N hydrochloric acid are added and the mixture is maintained at boiling point for 1 hour. The mixture is poured on to sodium bicarbonate and extracted with 65–70° C. petroleum ether. The mixture is washed until neutral and dried on sodium sulphate. The following Retinene is then obtained:

$E_{1\,cm.}^{1\%}$ maximum $370\mu = 1,100$ (isopropanol)

Determination of methoxy group: 0.8%.

*Purification.*—The Retinene can be purified through the agency of its cyanacethydrazone which occurs in the form of orangy-brown flakes:

$E_{1\,cm.}^{1\%}$ maximum $380\mu = 1,775$ (isopropanol)

Hydrolysis of this cyanacethydrazone with formol leads to a purified Retinene:

$E_{1\,cm.}^{1\%}$ maximum $385\mu = 1,350$ (isopropanol)

Example 14

Acetylated derivative of the beta-keto-enol $C_{24}$ IIIa ($n=3$, $R_1=CH_3$), or 13-(2':6':6'-trimethyl-cyclohexene-1'-yl)-7:11-dimethyl-1-acetoxy-3-keto-trideca-1:4:6:8:10:12-hexa-ene, or Acetoxy $C_{24}$ for short.

380 cc. of anhydrous ether, followed by 38 g. of dry sodium methylate, are introduced into a 2 litre flask fitted with an agitator and dropping funnel, a stream of nitrogen being provided and protection from dampness being provided. The temperature is lowered to about +5° C. and maintained at that value while about 59 g. of ethyl formate in 85 cc. of ether are introduced over a period of one quarter of an hour. 100 g. of ketone $C_{23}$ I ($n=3$) which has been purified, for instance, by crystallization $E_{1\,cm.}^{1\%}$ maximum $400\mu = 1,600$ (isopropanol)—melting point 95° C and dissolved in 5 cc. of anhydrous ether are then introduced. The reaction is allowed to continue for 2 hours with vigorous agitation, the temperature slowly rising to +18° C. The mixture is re-cooled to a temperature of from 0–5° C. and 76 g. of acetic anhydride in 370 cc. of anhydrous ether are introduced. The temperature is allowed to rise, and the agitation continues for 2 hours.

The mixture is poured into water, washed with water three times, dried on sodium sulphate and the ether is evaporated. This gives 136 g. of raw product. The same is recrystallized in petroleum ether to give 69 g. of solid orange product:

$E_{1cm.}^{1\%}$ maximum $430\mu = 1,280$ (isopropanol)

Melting point: 136° C.

Example 15

Corresponding dimethyl beta-keto-acetal V$a$ ($n=3$, $R_2=R_3=CH_3$) or 13-(2':6':6'-trimethyl-cyclohexene-1'-yl)-7:11-dimethyl-1:1-dimethoxy-3-keto-trideca-4:6:8:10:12-penta-ene, or Acetal $C_{24}$ for short.

25 g. of the acetylated derivative of the beta-keto-enol $C_{24}$ prepared as described in example 14 are dissolved in 250 cc. of methanol. 25 cc. of concentrated sulphuric acid are added. The mixture is allowed to stand at ambient temperature for 2 hours, and is then poured on to a 5% sodium bicarbonate solution and extracted with 65–70° C. petroleum ether. The mixture is washed until neutral with bicarbonate, then washed with water and dried on sodium sulphate. After evaporation of the petroleum ether 23 g. of dimethyl-beta-keto-acetal $C_{24}$ are yielded:

$E_{1cm.}^{1\%}$ maximum $400-405\mu = 1,230$ (isopropanol)

Determination of methoxy group: 13.5%.

Example 16

Corresponding dimethyl beta-methyl-beta-hydroxy-acetal VI$a$ ($n=3$, $R_2=R_3=CH_3$), or 13-(2':6':6'-trimethyl-cyclohexene-1'-yl)-3:7:11 - trimethyl - 3 - hydroxy-1:1-dimethoxy-trideca-4:6:8:12-penta-ene, or Hydroxyacetal $C_{24}$ for short.

23 g. of dimethyl beta-keto-acetal $C_{24}$ prepared as described in Example 15 are dissolved in 70 cc. of anhydrous ether and added at ambient temperature to a solution of methyl-magnesium chloride (prepared from 3 g. of magnesium), in 100 cc. of anhydrous ether. The addition should take about half an hour, whereafter the mixture is slowly poured on to an iced acidulated solution. The mixture is washed with water and with 5% bicarbonate, and then with water until it is neutral. The mixture is dried and the ether is evaporated, to give 22 g. of dimethyl betal-methyl-beta-hydroxy-acetal:

$E_{1cm.}^{1\%}$ maximum $355\mu = 1,195$ (isopropanol)

Determination of methoxy group: 12.75%.

Example 17

Aldehyde $C_{25}$ VIII ($n=3$), or 15-(2':6':6'-trimethyl-cyclohexene-1'-yl)-3:7:11- trimethyl-trideca - 2:4:6:8:10:12-hexa-ene-1-al.

22 g. of dimethyl beta-methyl-beta-hydroxy-acetal are heated to boiling point in 440 cc. of pure acetone with 1% of an antioxidant. 9 cc. of N hydrochloric acid are then added and the boiling is maintained for 1 hour. The mixture is poured onto sodium bicarbonate and extracted with 65–70° C. petroleum ether. The mixture is washed until neutral and dried on sodium sulphate. An aldehyde $C_{25}$ with the following features is obtained:

$E_{1cm.}^{1\%}$ maximum $420/425\mu = 1,300$ (isopropanol)

Determination of methoxy group: 0.5%.

Example 18

Ketone $C_{18}$ I ($n=2$) or 8-(2':6':6'-trimethylcyclohexene-1'-yl)-6-methyl-octa-3:5:7-triene-2-one.

The ketone $C_{18}$ I ($n=2$) can be prepared from the beta-ionylidene-acetaldehyde VIII ($n=1$) in accordance with French specification No. 1,167,007 of February 4, 1954. A raw ketone $C_{18}$ having the following features can therefore be prepared from raw beta-ionylidene-acetaldehyde which may or may not be isolated:

$n_D^{18} = 1,602$ $E_{1cm.}^{1\%}$ maximum $345\mu = 850$ (isopropanol)

A raw but already pure $C_{18}$ ketone, with the following features:

$n_D^{18} = 1,618$ $E_{1cm.}^{1\%}$ maximum $345\mu = 1,100$ (isopropanol)

is prepared from purified beta-ionylidene-acetaldehyde having the following features:

$E_{1cm.}^{1\%}$ maximum $325\mu = 650$ (isopropanol)

This example shows how simple it is in practice to link the reactions when dehydration and hydrolysis are performed in acetone. The use of acetone as solvent makes it possible to pass directly from hydroxy-acetal VI ($n=1$) to the ketone $C_{18}$ ($n=2$) without isolating any intermediate product.

From raw but unisolated beta-ionylidene-acetaldehyde: 165 cc. of 6.5% aqueous soda are added to the solution obtained after one hour's boiling as described in Example 8$b$, after such solution has been cooled to ambient temperature. The agitation and the nitrogen stream are maintained for 2 hours. The solution is acidified with 250 cc. of 0.6 N hydrochloric acid and extracted with 250 cc. of 65–70° C. petroleum ether. The mixture is washed until neutral and dried, and the ether is evaporated. 47 g. of raw ketone $C_{18}$ are left:

$n_D^{18} = 1.605$ $E_{1cm.}^{1\%}$ maximum $345\mu = 800$ (isopropanol)

*Purification.*—The ketone $C_{18}$ can be purified by molecular distillation or through the agency of its cyanacethydrazone which appears in the form of yellow flakes:

$E_{1cm.}^{1\%}$ maximum $345\mu = 1,600$ (isopropanol) melting point 185° C.

Hydrolysis of this cyanacethydrazone leads to a purified ketone $C_{18}$:

$n_D^{18} = 1.620$ $E_{1cm.}^{1\%}$ maximum $345\mu = 1,140$ (isopropanol)

Example 19

Ketone $C_{23}$ I ($n=3$), or 12-(2':6':6'-trimethylcyclohexene - 1' - yl)-6:10-dimethyl-dodeca-3:5:7:9:11-pentaene-2-one.

Ketone $C_{23}$ I ($n=3$) is prepared from the Retinene VIII ($n=2$) by the same technique providing the passage from beta-ionylidene-acetaldehyde VIII ($n=1$) to the ketone $C_{18}$ I ($n=2$), as described in French specification 1,167,007 of February 4, 1954.

A ketone $C_{23}$ with the following features can be prepared from the raw Retinene:

$E_{1cm.}^{1\%}$ maximum $400\mu = 1,250$ (isopropanol)

This ketone $C_{23}$ can be purified by any appropriate means, such as extraction with T reagent, chromatography on alumina and crystallisation. A purified ketone $C_{23}$ with the following features is then given:

Melting point: 95° C. $E_{1cm.}^{1\%}$ maximum $400/405\mu = 1,600$ (isopropanol)

What we claim is:
Reacting the compound:

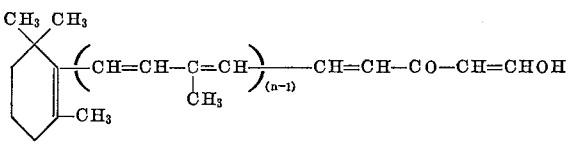

wherein $n$ is an integer from 1 to 3, with a compound selected from the group consisting of acid anhydrides of the formula, $$(R_1-CO)_2O$$

and acid chlorides of the formula, $$R_1-COCl$$

wherein $R_1$ in the above formulas is a lower alkyl radical, to produce the ester:

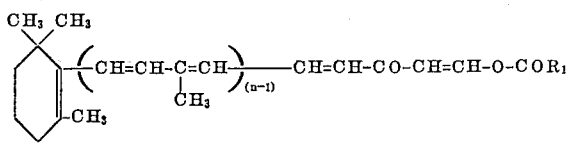

reacting said ester with methanol in the presence of traces of an acid catalyst to produce the acetal:

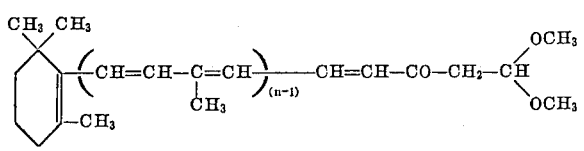

reacting said acetal with an excess of a Grignard reagent:

$$CH_3Z$$

wherein Z is selected from the group consisting of lithium, halogenomagnesium radicals MgX and halogeno-zinc radicals MgX and halogeno-zinc radicals ZnX wherein X is a halogen, to produce the hydroxy acetal:

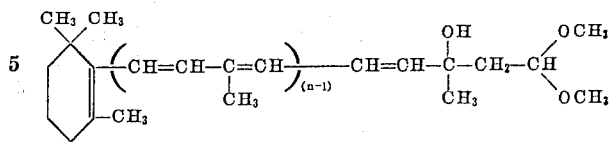

treating said hydroxy acetal with a trace of acid in methanol to produce the dehydrated acetal:

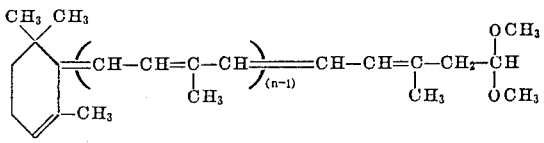

purifying said dehydrated acetal and then treating with aqueous hydrochloric acid in acetone to form:

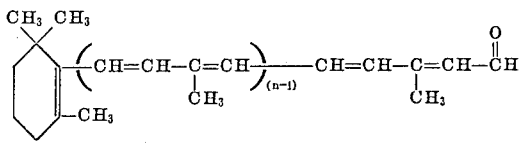

References Cited in the file of this patent

Schantz: Jour. Amer. Chem. Soc., vol. 68 (1946), pages 2553–2557.